United States Patent [19]

Lenker et al.

[11] 4,385,702
[45] May 31, 1983

[54] VIBRATING SEPARATOR

[75] Inventors: Don H. Lenker; Dennis F. Nascimento, both of Salinas, Calif.

[73] Assignee: The United States of America as represented by the Secretary of Agriculture, Washington, D.C.

[21] Appl. No.: 290,542

[22] Filed: Aug. 6, 1981

[51] Int. Cl.³ .............................................. B07C 5/00
[52] U.S. Cl. .................................... 209/629; 209/685
[58] Field of Search ............... 209/685, 629, 635, 691, 209/692, 693, 695; 56/16.5, 327 R

[56] References Cited

U.S. PATENT DOCUMENTS 1,747,625  2/1930  Gudmundsen et al.
2,116,006  5/1938  Thys ................................ 209/685 X
2,788,124  4/1957  Miller .................................. 209/693
2,964,180  12/1960  Holzenthal ...................... 209/685 X
3,612,272  10/1971  Aidlin ................................. 209/685
4,009,783  3/1977  Park.

Primary Examiner—Allen N. Knowles
Attorney, Agent, or Firm—M. Howard Silverstein; David G. McConnell; Margaret A. Connor

[57] ABSTRACT

An apparatus for separating objects of different shapes or sizes is described. A vibrating conveyor belt is equipped with upwardly projecting fingers spaced at intervals to entrap therein objects of a particular size or shape and convey them in the direction of the movement of the belt and to simultaneously support objects of another shape or size on the ends of the fingers and to convey them by vibration in a direction different from the movement of the belt, thereby separating the objects.

4 Claims, 5 Drawing Figures

VIBRATING SEPARATOR

BACKGROUND OF THE INVENTION

This invention relates to and has among its objects the provision of a novel apparatus for separating objects of different sizes or shapes and finds particular use in separating fruits, vegetables and other agricultural crops from twigs, leaves and other trash.

Presently, the primary method of harvesting vegetables is by the use of hand labor. This requires a large number of workers as the optimum period of harvesting is short relative to the growing period. In most cases the hand picking of vegetables is very arduous, thus, it is becoming increasingly difficult to obtain pickers. This shortage of hand harvest labor results in the loss of vegetable crop which is not harvested.

Where hand harvest labor is available, increases in labor costs contribute significantly to the production costs and increase final product costs. In some cases, such as chili peppers, the United States production costs are so high that a significant portion of chili pepper products are imported. Decreases in production costs would favor United States competition in this area.

The introduction of mechanized harvesters to remove vegetable and fruit crops from plants and trees or mechanically pick up crops which have fallen on the ground often results in a crop intimately mixed with twigs, leaves, and the like which decreases the quality of the crop; these contaminants cannot be readily removed by techniques such as screening or air separation. As mentioned above, costs of hand labor separation would add significantly to production costs. Mechanical separators used to separate agricultural products such as those which separate smooth objects from those with friction creating surfaces (U.S. Pat. No. 4,009,783), have the disadvantage that they are only of use with products having smooth surfaces such as peas, lentils, and the like. Sorters which separate by impaling objects such as sugar beet tailings on spines to separate them from material not impaled (U.S. Pat. No. 1,747,625) have the disadvantage that vegetables and fruits would be damaged by the impaling.

SUMMARY OF THE INVENTION

The invention described herein provides a means for separating objects on the basis of shape and size and finds particular use in separating sticks and trash from fruit and vegetable crops.

In the apparatus of the invention, a conveyor belt having upwardly projecting fingers is fixed to a frame. Also mounted on the frame are means for vibrating the belt and attached fingers. The fingers are spaced such that objects of a particular size or shape are entrapped therein and conveyed in the direction of the movement of the belt while objects of a different size or shape are supported on the ends of the fingers and conveyed by vibration over the ends of the fingers in a direction different from the direction of the movement of the conveyor belt, thereby separating the entrapped objects from the supported objects.

The primary advantage of the invention is the separation of objects with different shapes or dimensions, particularly those objects not susceptible to separation by usual methods such as screening, sieving, air separation and the like.

One particular advantage is that fruits or vegetables can be readily separated from intermixed twigs, leaves, roots and other trash. However, the invention finds utility wherever separation of objects having dissimilar shape or size is desired.

Another important advantage is that the invention can readily be used in combination with mechanical harvesting devices which remove fruit or vegetables from plants or trees or which mechanically pick up crops which have fallen on the ground. Considerable time and expense of hand labor necessary to separate a crop from comingled trash are saved, thus, reducing the price of the final product or loss of the product due to unavailability of hand labor.

Another important advantage of the invention is that it can be used in the field. Money and energy are saved as only the fruit and vegetables harvested need be transported. The trash can be left in the field and used as mulch.

DESCRIPTION OF THE PREFERRED EMBODIMENTS

Figure 1:
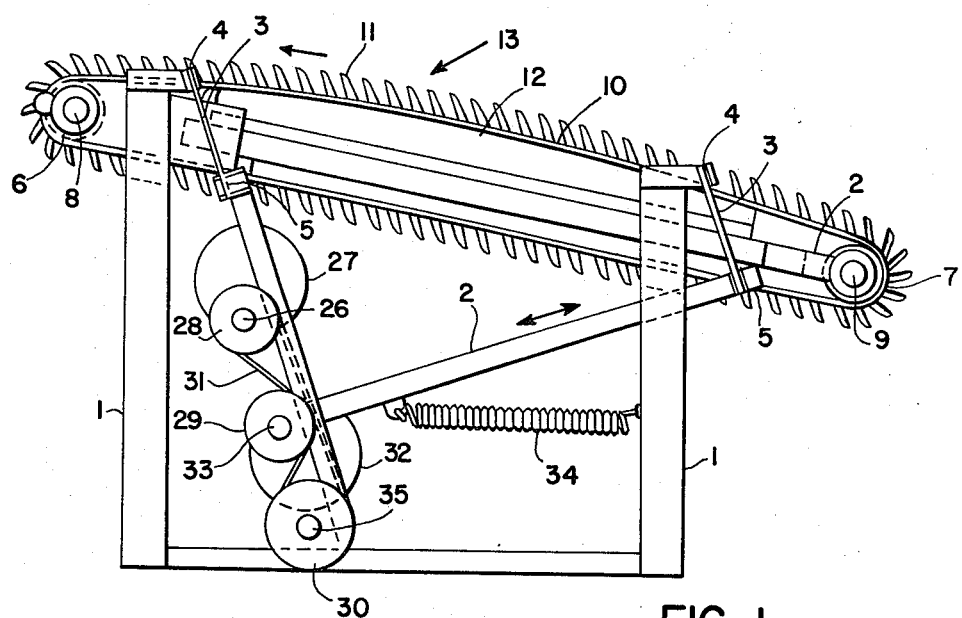
FIG. 1 is a side view of a particular embodiment of the invention.
Figure 2:
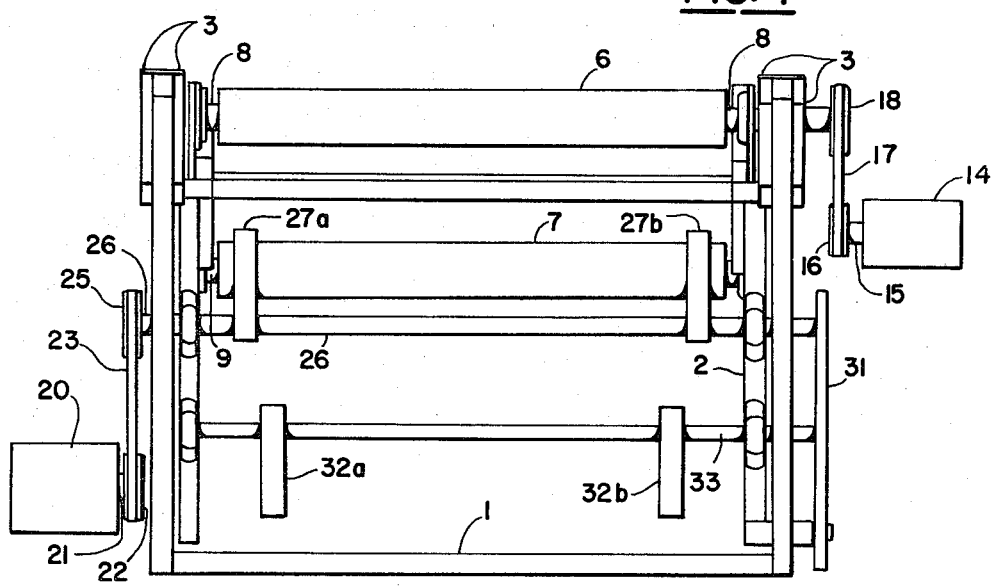
FIG. 2 is an end view of the embodiment of FIG. 1 with the conveyor belt removed.

The invention is next described with reference to the drawings. Referring to FIGS. 1-2, main frame 1 flexibly supports belt frame 2 by means of flexible strips 3 which are fixedly attached to main frame 1 at 4 and the belt frame 2 at 5. Shafts 8 and 9 to which pulleys 6 and 7 are fixedly attached are rotatively journaled to belt frame 2. Conveyor belt 10 surrounds pulleys 6 and 7 and has upwardly projecting fingers 11 attached thereto. Curved belt frame member 12 is affixed to belt frame 2 and supports belt 10 in the separating area 13 so that belt 10 remains snug against belt frames 12 and 2 and pulleys 6 and 7 and vibrates with frame 2 and 12 and not independently therefrom. Belt 10 is moved by turning sheave 18, attached to shafts 8, by means of motor 14, shaft 15, pulleys 16 and belt 17.

Shaft 26, which is journaled to belt frame 2, is driven by motor 20 through shaft 21, pulleys 22 and 25 and belt 23. Weights 27 located on shaft 26 are eccentrically affixed thereto; sprocket 28 is concentrically affixed to shaft 26. Chain drive 31 surrounds sprocket 28, contacts one side of sprocket 29, and surrounds idler 30 which is connected to belt frame 2 through a bearing. Shaft 33 is journaled to belt frame 2; weights 32 are eccentrically attached to shaft 33 and sprocket 29 is concentrically attached to shaft 33. The location of weights 27 along the length of shaft 26 and of weights 32 on shaft 33 is not critical; however, weights 27 must be equidistant from the centerline of belt frame 2 and weights 32 must be equidistant from the centerline of belt frame 2.

Weights 27a and b are positioned on shaft 25 in relation to each other so that they work in synchrony, that is if weight 27a was superimposed on 27b, the position of eccentricity of both weights would be substantially the same. Weights 32a and b are positioned on shaft 31 so that they rotate in synchrony and in a direction opposite to the rotation of weights 27a and b. It is desirable that the eccentric most position of weights 27a and b and the eccentric most position of weights 32a and b are opposite during rotation so that the vibration will be in a direction substantially perpendicular to the flexible strips 3. Spring 34 is attached to belt frame 2 and main frame 1; it applies sufficient force to keep the flexible strips 3 straight when the machine is at rest. The spring constant of spring 34 must be small enough to prevent excessive vibration from being transmitted to frame 1.

The operation of the vibrating apparatus is next described in detail with reference to FIGS. 1 and 2.

The objects to be separated are fed onto belt 10 by any conventional means. Motor 14 rotates shaft 15 and affixed pulley 16 thereby driving belt 17 and sheave 18. This in turn causes shaft 8 and affixed pulley 6 to rotate so that conveyor belt 10 and affixed fingers 11 move in the direction of the single ended arrow. Objects of a size and shape small enough to fit between the fingers are entrapped in the fingers and are conveyed in the direction of the movement of the belt. At the same time, motor 20 causes shaft 26 to rotate by the rotation of shaft 21, pulleys 22 and 25, and belt 23, thereby causing eccentric weights 27 to rotate. Shaft 26 drives sprocket 28, chain drive 31 and sprocket 29 to cause shaft 33 and affixed eccentric weights 32 to rotate in a direction opposite the rotation of weights 27. These counter-rotating eccentric weights are driven and synchronized to cause belt frame 2 which is suspended on flexible strips 3 to vibrate in a direction substantially perpendicular to flexible strips 3 as shown by the double ended arrow and convey by vibration the objects supported on the fingers in a direction opposite to the movement of the belt. Flexible strips 3 are made of material such as conventional belt material and the like and allow belt frame 2 to vibrate without transmitting excessive vibration to main frame 1, that is, vibration which would create undesirable noise and vibration if the invention were attached to a harvesting device or free standing.

Upwardly projecting fingers 11 fixedly attached to conveyor belt 10 are spaced at intervals so that objects of a particular size or shape are entrapped by the fingers and carried in the direction of the movement of the belt and objects to be separated which have a different shape or size are prevented from falling between the fingers. The supported objects are vibrated across the ends of the fingers in a direction other than the direction of the belt. Thus, it is seen that the spacing dimensions of the fingers are dependent on the sizes and shapes of objects to be separated. The length of the fingers is not critical, however, they should be long enough to entrap objects and prevent them from being dislodged by vibration. Also, they should be close enough together to support the other objects so that the supported objects are conveyed by vibration along the surface of the fingers without being hindered by the entrapped objects. The fingers should not be so long as to vibrate excessively, that is, to a degree that the entrapped objects are dislodged.

Figure 3:
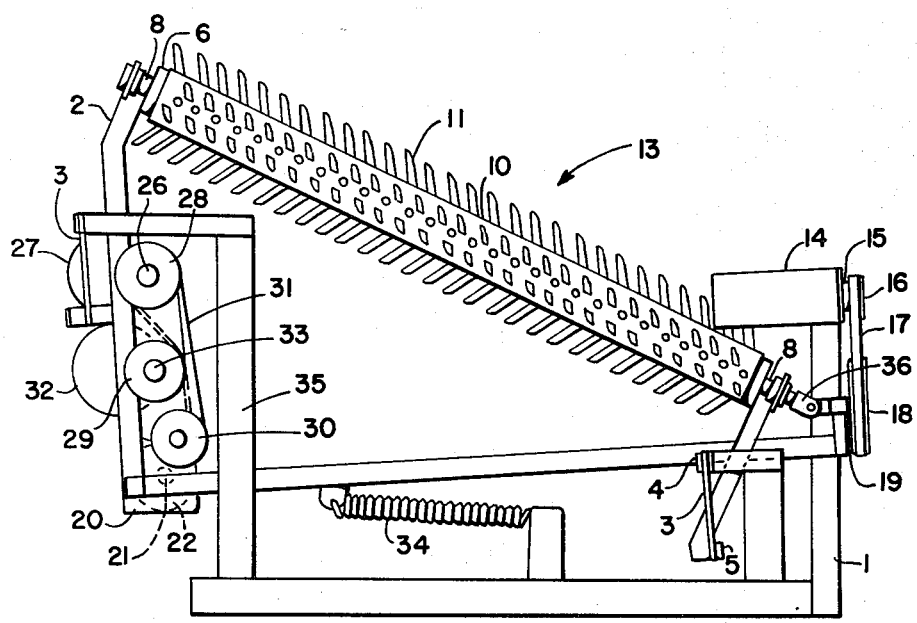
FIG. 3 is a side view of an embodiment.
Figure 4:
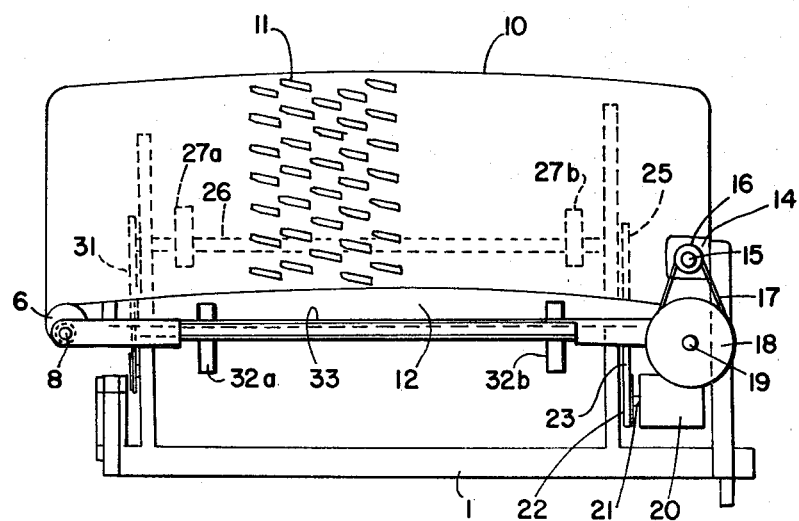
FIG. 4 is an end view of the embodiment of FIG. 3.

It is preferable that the fingers are at an angle to the belt to assist in preventing dislodgement of the entrapped objects by vibration. Angling is of particular importance when the belt is used at high vibration speeds. The degree of angling depends on the size and shape of the objects to be separated, that is, the angle should be such that the supported objects are supported on and vibrated across the projecting fingers in one direction while the objects to be entrapped caught by the fingers and conveyed by the belt in another direction. In the embodiment depicted in FIG. 1 the movement of conveyance by vibration is opposite (180 degrees) to the movement of the belt. In some cases, it may be desirable to attach belt 10 to the frame so that the movement of the belt is at right angles to the movement of conveyance by vibration such as shown in FIGS. 3 and 4. In this embodiment shaft 8 is connected through universal joint 36 to shaft 19 which is affixed to sheave 18. The movement of the entrapped objects is not directly opposed to the supported objects thus hindrance of the movement of conveyed (supported) objects by entrapped objects is lessened. The belt movement and vibration conveyance movement could be arranged at other angles as desired; the critical feature is that the angle be sufficient to separate the entrapped and supported objects.

FIG. 1 depicts a sloped belt to aid in vibration conveyance This is not a critical feature, however; the belt may be level or sloped in the opposite direction if changes in the belt slope are compensated for by changes in vibration frequency. The critical feature is that the vibration conveyance movement and belt movement are adjusted to be sufficiently different to separate the entrapped objects from those supported and conveyed by vibration on the fingers.

Other methods of providing vibration to the belt can be used. For example, the counter-rotating eccentric weights could be replaced by a crank shaft journaled to main frame 1 and rotatively connected to a connecting rod which was rotatively mounted on belt frame 2 so that rotation of the crank shaft would cause the connecting rod to move and vibrate the belt frame, conveyance belt and affixed fingers. Flexible strips 3 could be replaced by pivot bars journaled to the main frame 1 at one end and to belt frame 2 at the other to allow vibration of the belt frame. It is within the compass of the invention to use structural features known to those skilled in the art which would impart a vibratory movement to the belt frame and cause the movement of vibration conveyance to be sufficiently different from the movement of the belt to separate the entrapped objects from the supported and vibrated objects. The vibration should be sufficiently strong so as to convey the objects supported on the fingers and not so strong as to dislodge the entrapped objects.

Figure 5:
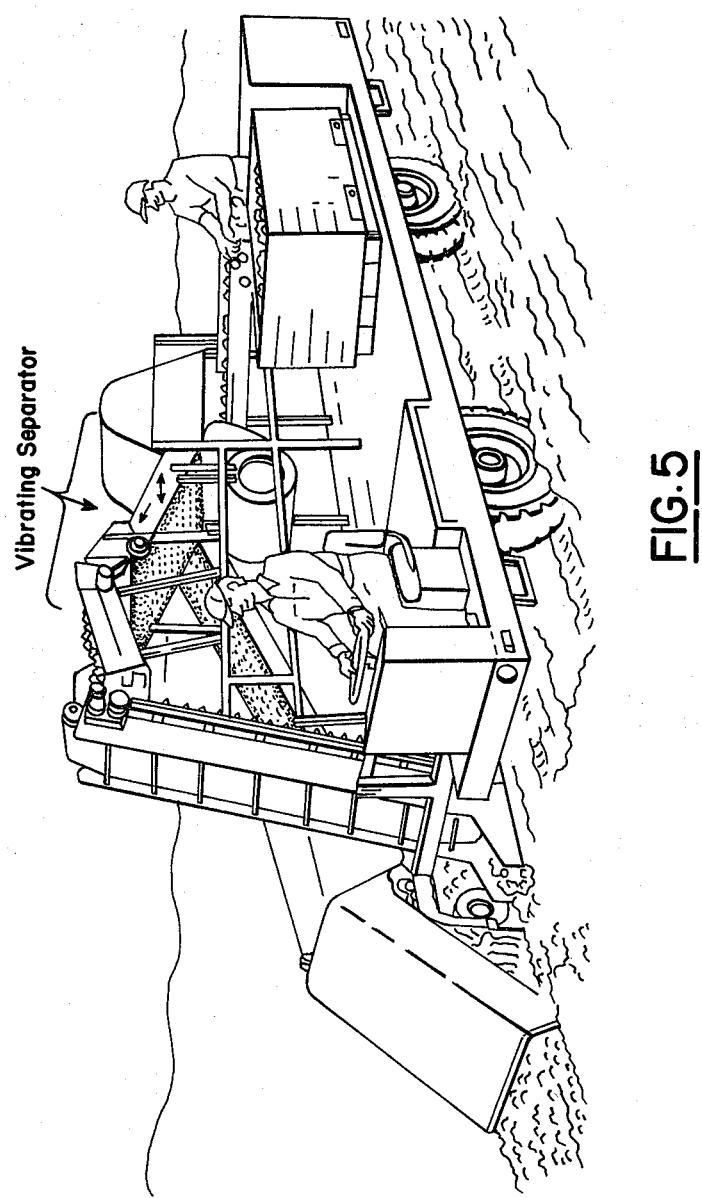
FIG. 5 is a view of the invention incorporated into a mechanical harvester.

The apparatus is used either free standing or incorporated into a mechanical harvester (FIG. 5) which picks up fruit or vegetables intermixed with twigs, leaves and other trash and feeds this mixture onto the vibrating separator.

Collecting bins are placed at required points to collect the separated objects. Where trash is separated from fruit or vegetables in the field, the trash may be left in the field and used as mulch.

This invention is further illustrated by the separation of chili peppers from sticks, leaves and other trash. This example is by way of illustration and not limitation. The invention also finds use to separate other vegetables such as tomatoes, other chili varieties, and fruits such as oranges, apples, and the like from leaves and twigs. It also could be used to separate objects other than agricultural produce. The only criteria is that the size differential be sufficient to allow objects to be supported on the belt fingers and conveyed by vibration and other objects to be entrapped by the fingers.

The following description of the operation of the invention is limited to separating chili peppers from trash.

Two kg of red chili peppers containing intermixed sticks, leaves, dirt and other trash was fed onto the invention in FIGS. 1 and 2. The counter-rotating eccentric weights were driven to vibrate the belt frame and belt with a stroke of about 1.5 cm at a frequency of 710 cpm in a direction perpendicular to the flexible strips. The belt which was 90 cm long and 60 cm wide traveled over a support member (12) having a curvature of 7.6 m radius, thereby insuring that the belt vibrated with the belt frame in a controlled manner. The angle between the direction of vibration and the plane of the belt was maintained at 36 degrees and should be 23 to 47 degrees. The slope of the belt frame was maintained at 17 degrees and should be 5 to 25 degrees.

The rubber fingers were 3.1 cm long and had a diameter of 0.63 cm at the base and 0.32 cm at the tip. The fingers were angled at 54 degrees measured from the plane of the belt to a plane passing lengthwise through the finger. The fingers were spaced so that the distance between fingers in the same row and the distance between rows was 2.5 cm. Fingers in alternate rows were positioned along a line perpendicular to the width of the belt at substantially identical points. Fingers in a row were positioned midway between the fingers of adjacent rows.

Approximately 90% of the trash was trapped by the fingers while approximately 95% of the peppers were conveyed by the vibration. The separation was completed in approximately 15 seconds. When the separator was incorporated into a mechanical harvester having a means to feed the chili peppers and intermixed trash, the separator removed the sticks and leaves from about 1000 kg of chili peppers per hour.

Having thus described the invention, what is claimed is:

1. A vibrating separator to separate objects of different sizes and shapes, comprising:
    (a) a frame;
    (b) a second frame supported by said first frame;
    (c) flexible support means attached to said first frame and supporting said second frame;
    (d) a conveyor belt mounted on said second frame;
    (e) upwardly projecting fingers attached to said belt and spaced at intervals to entrap objects of a particular size and shape and convey them in the direction of the movement of the belt and to support objects of a different size and shape on the surface of the fingers and convey them by vibration in a direction different from the movement of the belt to separate the entrapped and vibrated objects;
    (f) means attached to said second frame for vibrating said belt and said fingers; and
    (g) means attached to said first frame for moving said conveyor belt.

2. The separator as recited in claim 1 wherein the direction of the movement of said belt is 180 degrees from the direction of the conveyance of objects by vibration.

3. The separator as recited in claim 1 wherein the direction of the movement of said belt is 90 degrees from the direction of the conveyance of objects by vibration.

4. The separator as recited in claim 1 further including means for receiving said separated objects.

* * * * *